(12) United States Patent
Grasso, Jr. et al.

(10) Patent No.: US 7,775,466 B2
(45) Date of Patent: Aug. 17, 2010

(54) PRODUCTION OF GLASS POWDER FROM WASTE GLASS, AND PRODUCTS MADE USING THE SAME, ESPECIALLY CONCRETE

(75) Inventors: Louis P. Grasso, Jr., New Rochelle, NY (US); Louis P. Grasso, Sr., Pelham Manor, NY (US); Patrick S. Grasso, Sr., New Rochelle, NY (US); Elliot Kracko, New Rochelle, NY (US); Cynthia A. Andela, Richfield Springs, NY (US); Ralph J. Acampora, Coxsackie, NY (US)

(73) Assignee: Empire Resource Recovery LLC, New Rochelle, NY (US)

( * ) Notice: Subject to any disclaimer, the term of this patent is extended or adjusted under 35 U.S.C. 154(b) by 0 days.

(21) Appl. No.: 12/222,424

(22) Filed: Aug. 8, 2008

(65) Prior Publication Data
US 2008/0295740 A1    Dec. 4, 2008

Related U.S. Application Data

(62) Division of application No. 11/012,726, filed on Dec. 16, 2004, now Pat. No. 7,413,602.

(51) Int. Cl.
*B02C 21/00*  (2006.01)
*B02C 17/02*  (2006.01)
(52) U.S. Cl. .................... 241/65; 241/24.22; 241/80
(58) Field of Classification Search ............... 241/79, 241/DIG. 38, 80, 97, 65, 24.22, 24.3
See application file for complete search history.

(56) References Cited

U.S. PATENT DOCUMENTS

| 4,030,670 | A | 6/1977 | Abernathy |
| 4,067,502 | A | 1/1978 | Morey et al. |
| 4,070,273 | A | 1/1978 | Morey |
| 5,184,781 | A | 2/1993 | Andela |

(Continued)

FOREIGN PATENT DOCUMENTS

CH    688550    11/1997

(Continued)

OTHER PUBLICATIONS

Shayan, "Value-Added Utilisation of Waste Glass in Concrete", IABSE Symposium, Melbourne 2002.

(Continued)

*Primary Examiner*—Faye Francis
(74) *Attorney, Agent, or Firm*—Gordon & Jacobson, PC

(57) ABSTRACT

A clean dry glass powder useful as a substitute for Portland cement in concrete, in paints, and for other known uses for glass powder produced conventionally can be produced from unsorted post-consumer waste glass, including a substantial fraction of non-glass items, by employing glass pulverizing equipment to reduce waste glass to small fragments, allowing removal of trash, employing a multistep washing process to clean the glass fragments, in the preferred embodiment using aggregate cleaning equipment, drying the fragments, preferably using fluidized bed techniques, and grinding the glass to a desired particle size, preferably using a ball mill, in combination with an air classification step to produce a glass powder of uniform particle size.

20 Claims, 2 Drawing Sheets

U.S. PATENT DOCUMENTS

| | | | |
|---|---|---|---|
| 5,246,174 | A | 9/1993 | Vitunac et al. |
| 5,350,121 | A | 9/1994 | Vitunac et al. |
| 5,620,101 | A | 4/1997 | Andela |
| 5,803,960 | A | 9/1998 | Baxter |
| 5,810,921 | A | 9/1998 | Baxter et al. |
| 5,944,268 | A | 8/1999 | Andela |
| 5,950,936 | A | 9/1999 | Bergart |
| 5,984,216 | A | 11/1999 | Andela |
| 6,112,903 | A | 9/2000 | Kimmel |
| 6,168,102 | B1 | 1/2001 | Bergart |
| 6,250,576 | B1 | 6/2001 | Harada |
| 6,296,699 | B1 | 10/2001 | Jin |
| 6,344,081 | B1 | 2/2002 | Pelot et al. |
| 6,446,886 | B2 | 9/2002 | Harada |
| 6,464,082 | B1 | 10/2002 | Kimmel |
| 6,488,762 | B1 | 12/2002 | Shi |
| 6,695,908 | B1 | 2/2004 | Raisch |
| 6,699,321 | B2 | 3/2004 | Pelot et al. |
| 6,743,287 | B2 | 6/2004 | Sunde |
| 6,749,679 | B2 | 6/2004 | Shi |
| 6,770,328 | B1 | 8/2004 | Whaley |
| 2003/0037708 | A1 | 2/2003 | Monawar |
| 2003/0041783 | A1 | 3/2003 | Monawar |
| 2004/0060479 | A1 | 4/2004 | Valenzano |

FOREIGN PATENT DOCUMENTS

| | | |
|---|---|---|
| GB | 2425532 A | 11/2006 |
| JP | 10017355 | 1/1998 |
| JP | 410266108 A | 10/1998 |
| JP | 2004123458 | 4/2004 |
| JP | 2004123458 A | 4/2004 |
| JP | 02006083039 A | 3/2006 |
| KR | 2001045071 A | 6/2001 |
| RU | 2342342 C1 | 12/2008 |
| WO | WO2004050582 A1 | 6/2004 |

OTHER PUBLICATIONS

Carver, "Use of Recycled Glass for Concrete Masonry Blocks", NYSERDA report 91-15 (1997).

"Recycling of Crushed Glass into Coating Products", NIST report GL-96-01 (1996).

Adham, "Classify Particles Using Fluidized Beds", CEP Magazine (Sep. 2001)54-57.

Remarque et al, Glass Powder asd a Reactive Addition for Blast Furnace Cements (partial; date unknown).

Byars et al "Conglasscrete II", WRAP Mar. 2004.

"Making Concrete with Glass-Now Possible" CSIRO press release (2002).

Dhir et al, "Expansive Alkali-Silica Reaction in Concrete containing Boro-silicate Glass", WRAP (2004).

Meyer et al, "Concrete With Waste Glass as Aggregate", in Proceedings of the Int'l Symp org. by Concrete Technology Unit (Dundee, Scotland (2001)).

"Study on the mechanical characteristics of concrete using the glass powder produced from waste bottles" Kojima et al, Semento, Konkurito Ronbusho (2000), 54, 484-489 (abstract only).

"Effect of fine glass powder on compressive strength of cement mortar" Izumo et al, Kenkyu Hokoku-Kantogakuin Daigaku Kogakubu (1996), 40(1),13-17.

"An experimental study on the physical and mechanical properties of containing waste glass powder" Park et al, Nonmunjip-Chunganam Taehakkyo Sanop Kisul Yonguso (2002), 17(1), p. 44-50.

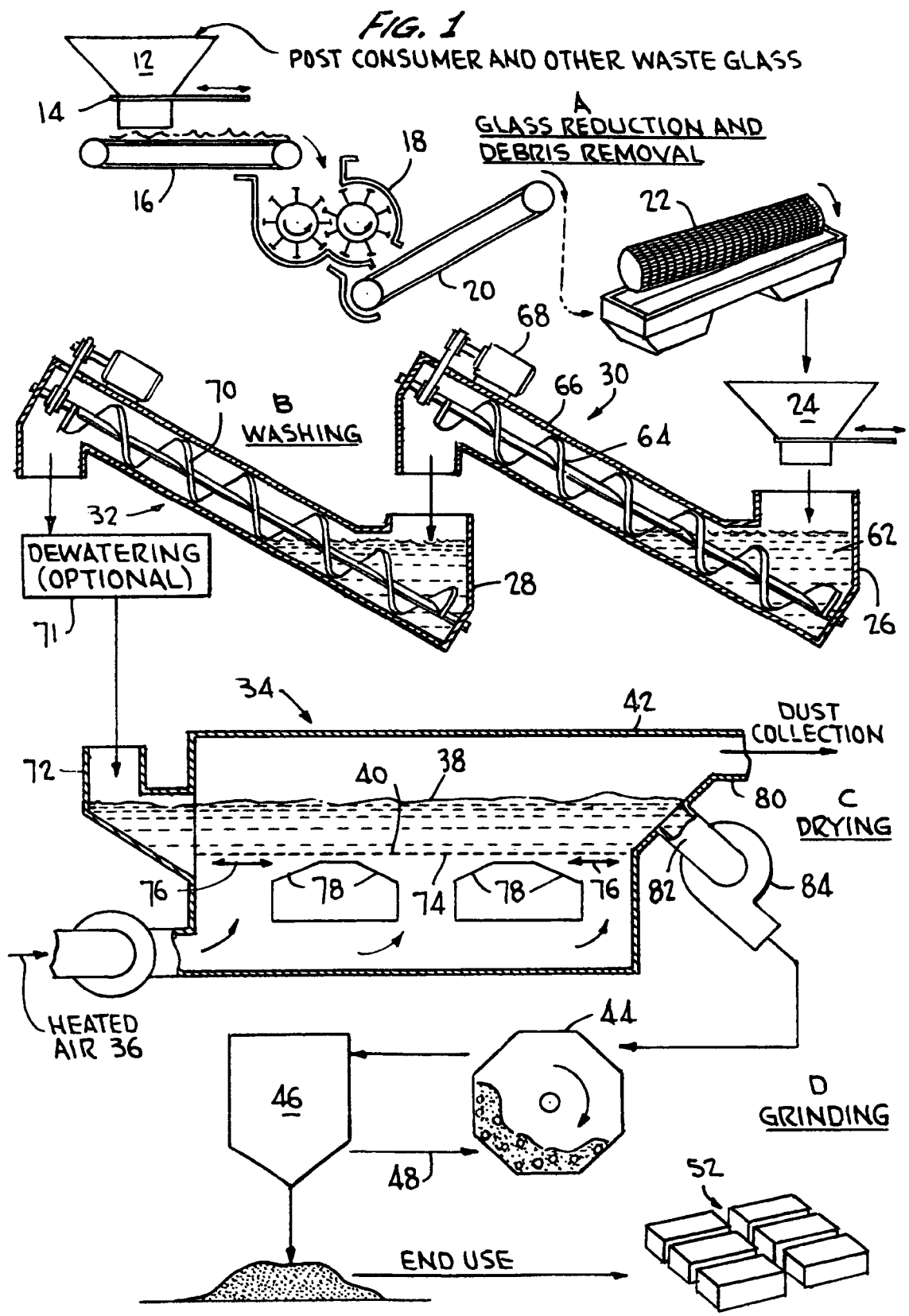

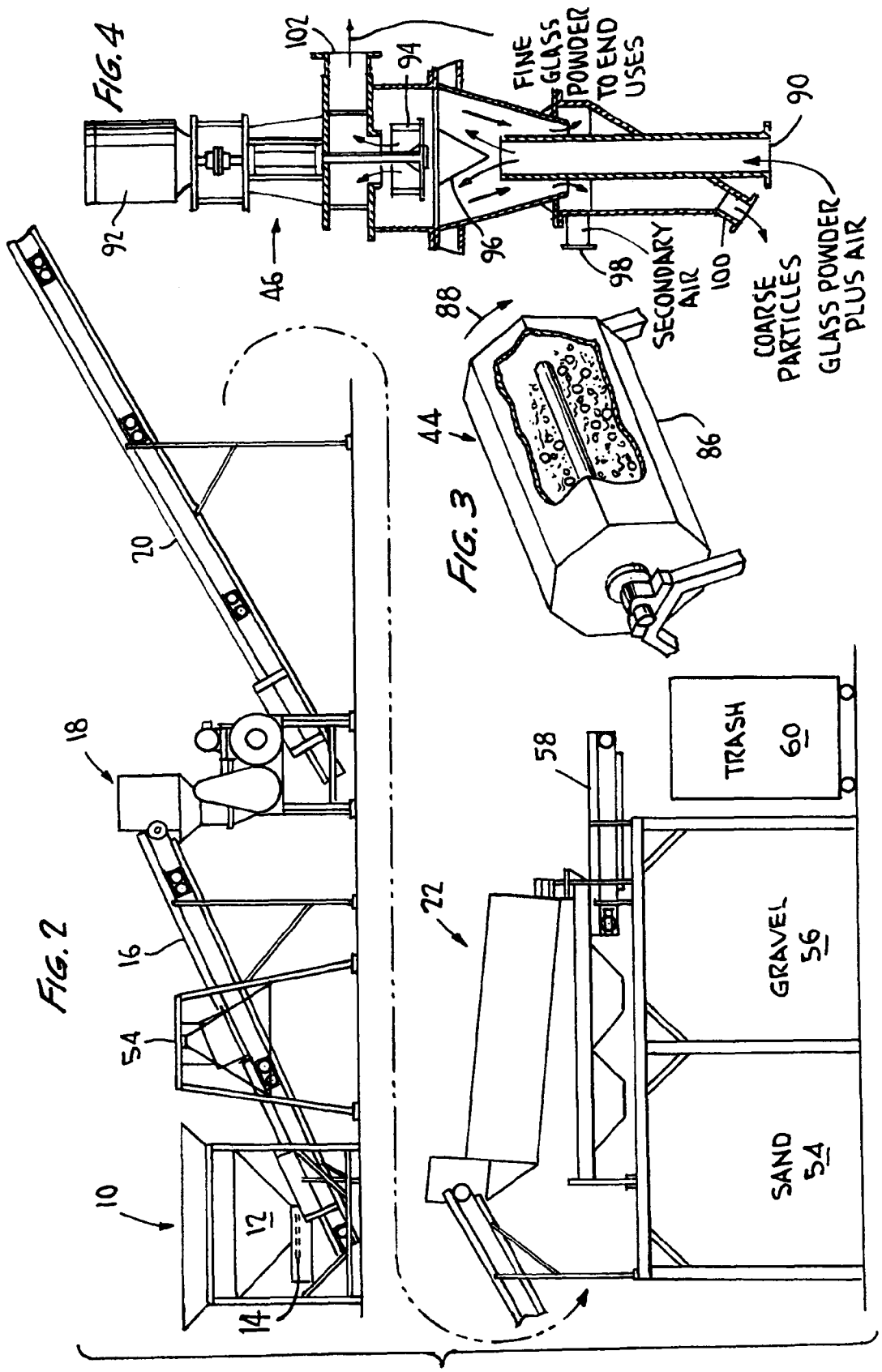

PRODUCTION OF GLASS POWDER FROM WASTE GLASS, AND PRODUCTS MADE USING THE SAME, ESPECIALLY CONCRETE

This is a divisional application of application Ser. No. 11/012,726 filed Dec. 16, 2004, now U.S. Pat. No. 7,413,602 issued Aug. 19, 2008.

FIELD OF THE INVENTION

This invention relates to producing clean and dry glass powder from unsorted post-consumer waste glass and its use in applications including, but not limited to, concrete mixes, paint additives, and filler media.

BACKGROUND OF THE INVENTION

Glass powder has been produced for years in limited quantities and is available to some extent for industrial applications. At present, glass powder is created from raw material and industrial waste, both of which are available in only selected locations. Increasing transportation costs have made it desirable to use glass that is available locally. This fact, and the glut of post-consumer waste glass available, makes post-consumer waste glass a logical choice for manufacture of glass powder. However, post-consumer waste glass has drawbacks as a feedstock, in particular its tendency to be contaminated with various foodstuffs and chemical residues, and to be mixed with trash, including labels and other paper scraps, as well as ceramic, plastic, and metal items of various sorts. These issues must be addressed and overcome in order to process post-consumer waste glass into usable glass powder in industrial quantities.

More specifically, for some years it has been commonplace for consumers to be expected to sort out empty glass containers for recycling. Ideally, this waste glass would be recycled as new containers. However, post-consumer waste glass is produced in various colors (clear, green, and brown being the most common) and cannot be sorted economically by automated equipment. Moreover, post-consumer waste glass tends to be mixed with plastic and ceramic waste, as well as undifferentiated trash. The difficulty of separating the glass from these other materials and separating the glass into its various colors has precluded efficient recycling of glass into new containers; as a result, most waste glass is now disposed of in landfills, a highly inefficient and undesirable end for this valuable material.

At the same time, it is known that under proper circumstances glass powder can serve as a substitute for some fraction of the Portland cement commonly used in concrete. While large glass particles are undesired as a component in concrete, due to a well-known alkali-silicate reaction (ASR) occurring between the silica of the glass and the alkali of other components of the concrete, which weakens the concrete, it is known that when the glass is powdered it behaves as a pozzolanic material, that is, will exhibit a cementing property when moistened. See, for example, Shayan, *Value-Added Utilisation of Waste Glass in Concrete*, IABSE Symposium Melbourne 2002; *Use of Recycled Glass for Concrete Masonry Blocks*, Carver et al, NYSERDA Report 97-15 (1997). At present Portland cement is in short supply. Accordingly it would be desirable if an efficient process for making high-quality, clean, dry powdered glass from post-consumer waste glass could be provided. The powdered glass thus made could be used in partial substitution for Portland cement in concrete and in other applications now known for powdered glass, e.g., paints and fillers for various products and uses.

U.S. Pat. No. 6,296,699 to Jin for "Inorganic binders employing waste glass" discusses using waste glass powder in concrete and "artificial stone". An alkali metal activator, for example, an alkali metal hydroxide, silicate, aluminate, carbonate, sulfate, phosphate or fluoride is mixed with the glass powder and water, and this material cured, in some examples at room temperature. Jin teaches that the waste glass should be cleaned in advance to remove residues such as sugar from the waste glass which can affect the setting and binding of the concrete. He further states that the processes used to create glass powder from waste glass, e.g., ball milling and pulverizing, are well known.

In a report titled "Recycling of Crushed Glass into Coating Products", CWC Report No. GL-96-1 (1998) the authors state that "paint and coating applications are especially sensitive to organic contamination. For example, one unwashed jar of mayonnaise could provide enough residue to bacterially contaminate many gallons of paint."

Vitunac et al U.S. Pat. Nos. 5,350,121 and 5,246,174 show methods for recycling glass, directed primarily to recycling of TV picture tubes, with much attention to removing heavy metals, coatings and the like. Pulverizing, washing, rinsing and further crushing steps are disclosed generally.

Abernathy U.S. Pat. No. 4,030,670 shows a trash recycling system including separation of various sorts of trash. Glass fragments are washed and dried.

Morey et al U.S. Pat. No. 4,067,502 and Morey U.S. Pat. No. 4,070,273 show flotation separation of glass fragments (up to 10 mesh) using amines as beneficiation agents.

Baxter U.S. Pat. No. 5,803,960 shows making glass for concrete reinforcement, while avoiding the alkali-silica reaction (ASR) by mixing a lithium-containing composition with crushed bottle glass. The glass may be provided in powder or fibrous form. Baxter et al U.S. Pat. No. 5,810,921 shows a similar invention using chromium instead of lithium.

Pelot et al U.S. Pat. Nos. 6,344,081 and 6,699,321 show concrete compositions, and emphasize the use of "electric" or "E-glass" powder of between 100 and 325 mesh in concrete. The claims require the glass particles to be no larger than 80-120 mesh, 40-60% between 180 and 220 mesh, and 10-30% less than 325 mesh; the cement used is to be low-alkali. The glass is to comprise up to 25% of the mix.

Bergart U.S. Pat. Nos. 5,950,936 and 6,168,102 show a system for recycling glass from a post-consumer waste glass stream including other sorts of debris. The process steps include various sorting, screening, crushing, presoaking, washing, dewatering, and drying steps. If a glass powder is desired, second crushing and separation steps may be included. The dewatering step can be performed using a rotary screw conveyor (col. 4, line 32 of the '936 patent), and the drying step using a fluidized bed dryer (col. 4, line 44). It is acknowledged that some ceramic content will remain, and it is asserted that if the ceramic content is not acceptable to the end user, a second crushing stage can be performed to form a fine glass powder; the "ceramic particles dispersed throughout the glass powder will dissipate in further processing". Col. 5, lines 48-52.

Kimmel et al U.S. Pat. No. 6,112,903 shows a method for sorting various types of glass from one another. A stream of glass cullet mixed with other items is heated using microwave energy; as different types of glass and items of other materials absorb different amounts of energy, they are differentially heated, and can be differentiated in a digital image made by a thermal imaging camera. A downstream diverter mechanism can then be used to separate out various constituents of the stream. Kimmel et al U.S. Pat. No. 6,464,082 shows a complete system employing this technique.

Harada U.S. Pat. Nos. 6,250,576 and 6,446,884 show a method and system for producing glass sands by crushing and agitating steps.

Sunde U.S. Pat. No. 6,743,287 shows a concrete using relatively large glass particles, requiring addition of a "non-alkali reactive mineral", e.g. granite.

Whaley U.S. Pat. No. 6,770,328 shows a method of making a terrazzo surface using recycled glass in an epoxy matrix. Preparation of the glass is not discussed.

Thus, although the prior art discusses the use of waste glass powder in various applications, in particular as a partial substitute for cement in concrete, notes that post-consumer waste glass is not being efficiently utilized, and provides some suggestions for processes for recycling post-consumer waste glass, the art does not disclose a reliable and efficient process for the production of suitably cleaned and dried glass powder from post-consumer waste glass and the integration of that process into a process for the manufacture of concrete and concrete products, in particular one which does not require the addition of substances intended to suppress the alkali-silica reaction.

OBJECTS OF THE INVENTION

It is therefore the principal object of the present invention to provide a method and apparatus for processing post-consumer waste glass, which can be expected to have residual substances adhering to it, and which is likely also to be contaminated with foreign material, into a clean dry fine powder that is ready for many applications.

It is a further object of the invention to provide a method for making concrete, using the glass powder reclaimed from post-consumer waste glass according to the invention, as a partial substitute for Portland cement.

A further object of the invention is to provide an integrated process for producing concrete and concrete products employing powdered glass produced efficiently from post-consumer waste glass, and wherein no additives are required to suppress the alkali-silica reaction.

SUMMARY OF THE INVENTION

The above objects of the present invention, and others which will appear as the discussion below proceeds, are met by the inventive method. This method produces clean glass powder from unsorted dirty post-consumer waste glass by, broadly speaking, 1) employing glass pulverizing equipment to reduce waste glass to small fragments, allowing removal of trash, 2) employing a multistep washing process to clean the glass fragments, in the preferred embodiment using aggregate cleaning equipment, 3) drying the fragments, preferably using fluidized bed techniques, and 4) grinding the glass to a desired particle size, preferably using a ball mill, in conjunction with an air classification step to produce a glass powder of uniform particle size.

The glass powder thus produced can be used as a partial substitute for Portland cement in concrete, as a filler in paints and other products, and for other known uses for glass powder produced conventionally.

BRIEF DESCRIPTION OF THE DRAWINGS

The invention will be better understood with reference to the accompanying drawings, in which:

FIG. 1 is a schematic depiction of the process of the invention for producing glass powder from post-consumer waste glass;

FIG. 2 shows an elevational view of the equipment employed to perform a first step in the process of the invention;

FIG. 3 shows a perspective, partly cut away view of a ball mill; and

FIG. 4 shows a cross-sectional view through a classifier.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that the description is not intended to limit the invention to those embodiments. On the contrary, the invention is intended to cover alternatives, modifications, and equivalents, which may be included within the spirit and scope of the invention as defined by the appended claims.

As noted above, the present invention relates to a new and improved process for producing glass powder suitable for a wide range of uses from post-consumer waste glass and other waste glass as may be available, to the powder produced thereby, to the equipment for practicing the process, and to the end uses of the powder thus produced. Accordingly, the invention allows a portion of the least recyclable waste glass stream, that of mixed-color broken post-consumer waste glass, now being disposed of primarily in landfills, to be turned to use in various products.

More specifically, a typical stream of post-consumer waste glass, as ordinarily available from a municipal recycling facility, contains up to 30% by weight of various trash, including metal items, paper, and plastic, as well as various organics, such as foodstuffs and residues, as well as a certain amount of dirt picked up in handling the waste stream. According to the invention the glass is separated from such streams and processed to a clean, dry, uniform glass powder suitable for a variety of applications, and specifically as a substitute for up to about 40% of the Portland cement in concrete.

FIG. 1 shows the principal steps A-D in the process of the invention, and depicts equipment for the practice of each step schematically. The additional drawings which follow illustrate some of the equipment components in more detail, to fully enable the practice of the invention.

The process begins with a first step A, termed Glass Reduction and Debris Removal. A stream 10 of post-consumer waste glass, including a substantial fraction of non-glass trash as described above, as well as glass from other sources if available, is provided to a surge hopper 12. As is well known in the art, a surge hopper is essentially a bin, typically funnel-shaped, fitted with a metering device 14, such as a reciprocating plate feeder, gate valve, or vibratory feeder, for controllably dispensing a solid material by gravity. In this case the surge hopper is used to meter out the stream of waste glass, mixed to greater or lesser degree (typically up to 30% by weight, as mentioned) with various undesired items of metal, plastic, paper, ceramics, foodstuffs, and the like, onto a conveyor belt 16. Belt 18 feeds the stream into a pulverizer 18, which may be essentially as shown in U.S. Pat. No. 5,944,268 to James Andela.

The glass in the waste stream is selectively reduced by the pulverizer into small fragments, typically ⅜" or less maximum dimension, so that these glass fragments can effectively be removed from larger items of non-frangible materials, such as steel, aluminum, paper, and plastic, by simple size-based separation. Paper, e.g., bottle labels, is usually removed from the glass fragments in the pulverizer as well. The small amount of ceramic material found in the typical stream of post-consumer waste glass can be processed together with the glass without detriment.

The pulverized glass is then delivered by a further conveyor belt 20 to a trommel 22, for further separation of the glass fragments by size, and further removal of larger particles of unwanted material. For example, glass "sand" of 1/8" or less is preferred for downstream processing, so glass fragments of larger size can be separated out and returned to the pulverizer, for further reduction, or can be set aside for use in different markets, e.g. as a constituent in asphalt for road-building. Trommel 22 may be as disclosed in U.S. Pat. No. 5,620,101 to Andela et al. Thus, in the first step A of the method, a stream of contaminate-free glass "sand" on the order of 1/8" is produced using a pulverizing and separation system comprising a surge hopper, pulverizer, and trommel. This process removes the larger fragments of extraneous material such as metals and plastics that are included in the collected glass, and pulverizes the glass into granules of substantially uniform size.

Step B of the process involves washing the glass sand, as noted. After pulverizing, the glass granules are fed via a conveyor to a washing system that consists of an infeed hopper 24, two or more basins 26 and 28 filled with water that is recirculated (that is, periodically withdrawn, filtered and returned), and a like number of helical conveyors 30 and 32 encased in metal tubes. Thus, the glass granules fall through the infeed hopper 24 into the first basin 26 where water washes the glass. In the basin, any paper and plastic that may remain tend to float to the surface, and can be removed, while sugars and other organic materials adhering to the glass particles are dissolved in the water, while the glass particles sink. An auger screw 64 then picks up the glass granules on the bottom of the basin and conveys them through a metal encased screen tube; at its end, the glass granules drop into a second basin 28 and are washed again. A second encased auger screw 70 then conveys the glass out of the system. The particles are dewatered to an extent as they are lifted by the screw conveyor; a further dewatering step 71 can be incorporated before the subsequent drying step if desired. It will be appreciated that other forms of washing equipment, e.g., known wet screening or spray tumbling equipment, might instead be used.

Step C, as indicated, is that of drying the washed glass particles. In the preferred embodiment, this is accomplished by employment of a fluidized bed drying system 34; however, it will be appreciated that other forms of drying equipment, e.g., known tumbler drying equipment, or a rotary kiln, might instead be used. The design of suitable fluidized bed equipment is discussed in detail by Adham, *Classify Particles Using Fluidized Beds, CEP Magazine,* 54-57 (2001). The fluidized bed apparatus 34 uses a furnace to dry the glass granules by forcing a stream of hot, pressurized air through the glass granules 38, shown resting on or suspended in the air stream just above a vibrating or oscillating perforated plate or screen 40. The process causes some light weight materials such as glass fines to become airborne. To capture these fines and to trap the hot air for recirculation, the bed has a dust collector 42 over its top. The vibrating screen 40 then transports the glass granules to the exit of the fluidized bed equipment 34, from which they are transported to step D.

Step D involves grinding the glass particles, as noted above typically of 1/8" or less, to a fine powder of 325 mesh minus. The preferred equipment for this step is a ball mill 44. Ball milling is a well-known process capable of rapidly grinding the glass particles to colloidal fineness. Briefly, ball milling is accomplished by admitting a quantity of the glass sand to a rotating steel drum, together with grinding media, such as steel balls or some other heavy media. It will be appreciated that other forms of fine grinding equipment, e.g., vibratory rod mills or jet mills, might instead be used. The glass powder is then conveyed via a pneumatic conveyor to a classification system 46 which captures the 325 mesh or smaller powder by using vacuums to pull this material away from any heavier material. The heavier material is then sent back to the ball mill as indicated at 48 for further grinding, or can be collected for other uses if desired. Having thus been reduced to a 325 mesh or smaller size, the glass is ready for use in various applications, e.g., as indicated at 52 as a partial replacement for Portland cement as a constituent in concrete blocks.

As mentioned above, FIG. 2 shows an elevational view of the equipment employed to perform the first step A in the process of the invention, that is, reduction of irregularly-sized glass objects and fragments, as typically found in post-consumer waste streams, to substantially uniformly sized glass particles, while removing trash therefrom, including paper, metal, and plastic. As described above, a typical stream of post-consumer waste glass, as obtained from the typical municipal waste facility, may in fact contain up to 30% by weight of non-glass trash of various sorts, which must be removed from the glass in the stream.

The stream of post-consumer glass and admixed undesirable material 10 is admitted to the surge hopper 12. A suitable surge hopper 12 is available from Andela Products, Ltd. of Richfield Springs, N.Y. under model number AMSH-86F. A reciprocating plate feeder 14 controls flow of the stream onto a first conveyor 16, which transports it to pulverizer 18. A magnetic separator is preferably mounted above conveyor 16, to remove ferrous material from the process stream. A suitable pulverizer is available from Andela Products, Ltd. of Richfield Springs, N.Y. under model number GP-2. As noted, pulverizer 18 may be as disclosed in U.S. Pat. No. 5,944,268 to Andela, incorporated herein by this reference. As discussed therein, pulverizers so designed efficiently reduce frangible materials such as glass to small fragments, typically 1/8" in maximum dimension, while allowing much larger items of nonfrangible materials, such as paper, plastic, aluminum and steel, to pass through, enabling a simple size-based separation to be carried out.

More specifically, selective reduction of glass takes place inside the pulverizer due to the design of the preferred flexible impactors or flails as disclosed in Andela U.S. Pat. No. 5,944, 268 mentioned above. As discussed therein, the pulverizer preferably comprises a pair of shafts each carrying a number of flexible flails rotating centrally within relatively closely-fitting cylindrical housings. A "tornado" type of air flow pattern created by the flails breaks the glass (or other breakable material) into fine granules, the edges of which are rounded as these particles collide with each other. However, items of materials that do not break well on impact, such as paper, plastics and metal, remain relatively whole in the tornado and exit the pulverizer as larger items, allowing a simple size based process to be used to separate the small glass granules from the larger fragments of undesired materials. The flexibility of the flails allows them to deflect, allowing plastic containers and cans to slide past the flails, so that such items are not shredded and the flails are not damaged. There are no internal screens or pinch points in the pulverizer that causes material to be reduced through any kind of "grinding" action; the glass particles are reduced by mutual contact.

Paper such as bottle labels is effectively removed in the pulverizer as well; any remaining paper adhering to the glass particles is removed in the subsequent washing step.

A second conveyor 20 then carries the glass particles to the trommel 22. A suitable trommel is available from Andela Products, Ltd. of Richfield Springs, N.Y. under model number ATROM-104. As discussed, this equipment may be essentially as described in U.S. Pat. No. 5,620,101 to Andela et al, incorporated herein by this reference. As shown in detail therein, the trommel comprises a cylinder comprising two coaxial screens of differing mesh sizes, which are rotated about an axis inclined at a slight angle to the horizontal. Accordingly, a size-based separation takes places as the mesh drum rotates and the particulate material moves therealong, with the smaller particles falling through the finer mesh at the upper end of the mesh drum, and so on. The effect is to sort the smallest glass particles into a first bin 54, labeled "sand" in FIG. 2; particles of up to a larger size fall into a second bin 56, labeled "gravel"; the remainder, typically larger particles or items of materials other than glass, is conveyed by a third conveyor 58 into a third bin 60 labeled "trash". Preferably, the larger-size glass particles collected in the "gravel" bin 56 are returned to the pulverizer 18, to be further reduced, so that ultimately the highest possible fraction of the post-consumer waste glass stream is reduced to a small "sand" particle size, preferably ⅛" or less.

Step B in the process of the invention is that of washing the particulate glass. As discussed above, this can be accomplished using screw or auger washing equipment. Equipment generally suitable for this step is sold under the trade name "Scrommel" by a company of that name, located in Salinas, Kans., for separating out the constituents of uncured concrete for reuse, and is illustrated schematically at step B in FIG. 1.

As discussed above, this equipment may comprise a first settling basin 26 into which the particulate material is dropped; a second surge hopper 24 may be provided to regulate the flow. Basin 26 is filled at least partially with water, as indicated at 62. If necessary, detergent or the like may be added to ensure the cleanliness of the glass. As mentioned above, any paper and plastic remaining in the stream of glass particulates tends to float to the surface of the water in the basin, and can be readily removed, while sugars and other organic materials adhering to the glass particles are dissolved in the water, and the glass particles sink.

A first helical screw conveyor 30, comprising an auger 64 driven for rotation by a motor 68, with its lower end extending into the settling basin 26, and fitting relatively tightly into a tubular enclosure 66, draws the particulate glass from the bottom of the basin 26 along enclosure 66. The glass then drops into a second settling basin 28 associated with a second similar helical screw conveyor 32, from which it is removed by a second similar auger 70. For further size separation, the first screw conveyor 30 can be fitted with a screen fitting around the auger screw, allowing smaller material to fall through the screen, and out an exit aperture in the enclosure; in this case the smaller material would be conveyed to the next stage in the process, and the larger material returned for further reduction or separation.

The washing stations thus provided can of course be multiplied if necessary, and detergents, solvents, or heated water can be employed. Dewatering takes place as the particulate glass travels upwardly along the screw conveyors; further dewatering can be performed, e.g., using centrifuge equipment, between this washing step and the subsequent drying step, as indicated at 71.

FIG. 1 also shows schematically at C the next step in the process of the invention, drying the washed glass. As illustrated, in the preferred embodiment the glass particles are dried using fluidized bed equipment, although other known drying equipment, such as rotary kiln equipment, is of course also within the scope of the invention. As mentioned above, the design of fluidized bed equipment, in particular for classification of particles by size, is discussed in detail by Adham, *Classify Particles Using Fluidized Beds, CEP Magazine*, 54-57 (2001).

The basic operation of such equipment is as follows, referring to FIG. 1. The particulate product to be classified and/or dried is introduced to the equipment 34 as at 72, e.g. by conveyor from the preceding step. A perforated or slotted plate or screen 40 may be provided to support the product as necessary, and is oscillated to move the product along, as indicated by arrows 76. A high-velocity stream of air, ordinarily heated, is introduced at 36. As indicated at 78, the air stream is ducted so as to blow upwardly through the "floor" provided by plate 40. The effect is to blow the incoming particulates into the air volume above plate 40, suspending them in the air stream, and thus forming the so-called fluidized bed. Clearly the particles in the bed will be buffeted by the heated air stream, and will be very effectively dried. The heavier particulates can be removed at 82, as they fall off the end of the oscillating plate 40. As the smaller particles or "fines" are lighter for their relative size, they will be lifted further upwardly by the air stream, and may be removed along with the exhausted air at 80. The heated air can be separated from the fines, filtered to remove the likely dust and particles of paper and the like, as well as some pulverized glass, and returned to the inlet of the apparatus used to heat the inlet air stream, saving some heating cost. A further vibratory screen might be added directly after the dryer, e.g., to perform a further size-based separation to further classify the glass granules for other markets.

As indicated above, the final principal step in the process of making glass powder from a typical stream of post-consumer waste glass according to this aspect of the invention is grinding the particulate glass to a powder of uniform size, preferably 325 mesh or less. As illustrated in FIG. 1, this can be accomplished using known ball milling equipment 44 for the grinding step, with a classifier 46 provided to ensure that any larger material that may avoid reduction is returned to the ball mill for further grinding. FIG. 3 shows a perspective, partly cut away view of a ball mill 44 and FIG. 4 shows a cross-sectional view through a particular type of classifier 46. Other types of grinding and classification equipment are within the scope of the invention.

As discussed above, and as illustrated by FIG. 3, the ball mill 44 comprises a steel drum 86, typically round or polygonal in cross-sectional configuration, supported for rotation about a central axis as indicated at 88. If the grinding is performed in a batch process, a quantity of glass particulates to be ground are charged into the drum 86 through an inlet port (not shown), along with a number of steel balls or similar heavy objects. As the drum is rotated, the balls gradually reduce the particulates to powder. After a suitable period of time, the powder is removed, again through a port (not shown). Alternatively, ball mills are known with continuous inlet and outlet flow, and these are also within the scope of the invention.

After milling, the powder is then preferably conveyed, typically by an air stream, to the inlet of a classifier 46. Suitable equipment, as illustrated in FIG. 4, is available from Comex AS, Trondheim, Norway. The stream of glass particles in air enters the classifier 46 through a vertical inlet 90 at the lower extremity of the unit. A motor 92 drives a rotor 94, pulling the inlet stream upwardly. The stream is dispersed around a static distribution cone 96, where coarse particles immediately settle in the lower velocity air stream, and are urged toward the conical outlet and fall toward the bottom of the classifier, to be withdrawn at 100. Secondary air is introduced at a further tangential inlet 98, to wash off finer particles that might otherwise adhere to the coarse particles. Fines introduced with the inlet stream are pulled through the rotor and exit at 102; these form the powdered glass produced according to the process of the invention, and accordingly are conveyed to an end use, bagged for storage or shipment, or simply accumulated in a bin. As mentioned above, and depending on the values of "coarse" and "fine" in the actual operation of the classifier 46, the coarse particles may be returned to the ball mill 44 for further reduction.

As mentioned above, one of the primary uses for the glass powder produced according to the method of the invention is as a partial replacement for Portland cement as a binder in concrete. Following are examples of processes for making concrete blocks and ready-mix concrete.

Concrete as used in masonry products, e.g., block, consists of a combination of various components. These include Portland cement which acts as a binder; fine and coarse aggregates; chemical admixtures; and various pozzolans that supplement cement. These include but are not limited to ground blast furnace slag and fly ash. These materials are combined with water and mixed to a uniform consistency to create concrete.

According to one aspect of the invention, powdered glass made according to the process described in detail above may be used as a replacement for up to 40% of the Portland cement content of otherwise conventional concrete. As is conventional for pozzolanic materials, at least 60% of the glass powder thus produced should be 325 mesh size or finer, and should contain no more than 2% moisture. More specifically, when using a fine glass powder as above as a substitute for Portland cement according to the invention, no additives need to be added to suppress the alkali-silica reaction ("ASR") that occurs when larger fragments of glass of certain compositions is employed as a component of concrete.

Manufacture of concrete using the glass powder according to the invention in partial substitution for Portland cement involves generally conventional processing steps. The component materials are to be mixed in a mixer for a minimum of 3 minutes. Under simultaneous vibration and compaction in steel molds, the mixture can be formed into various shapes and sizes for the masonry market. The formed products are placed on curing racks for a pre-set time, typically a minimum of 2 hours. Once pre-set, the products are placed in a curing chamber in which the ambient air is saturated with steam to further cure the concrete of the products. Within 24 hours the various masonry products may be packaged and prepared for shipment.

In making ready-mix concrete, various components, primarily comprising Portland cement as a binder and aggregates, are combined with a pre-measured amount of water to form concrete. Again, as above, according to one aspect of the invention, powdered glass made according to the process described in detail above may be used as a replacement for up to 40% of the Portland cement content of otherwise conventional concrete. The powdered glass is to be charged into a mixer at the same time the Portland cement is added to the remaining components. After thorough mixing, typically for a minimum of 5 minutes, the concrete containing glass powder produced according to the invention may be placed in the same manner as conventional concrete.

Similarly, glass powder produced according to the invention can be used in other known application for powdered glass, for example in paints and as fillers.

Accordingly, those of skill in the art will appreciate that according to the invention readily available post-consumer waste glass is removed from the waste stream and processed to create glass powder in industrial quantities that can be used in many applications. More specifically, according to the invention, part of the post-consumer waste glass stream that is normally directed into landfills is diverted and processed into a powder that is clean and dry enough for applications that are usually reserved for glass powder developed from new glass or industrial waste glass only. Moreover, this is accomplished using machinery of essentially conventional design from multiple industries, but employed in a unique, novel, and unobvious way to pulverize, wash, dry, and classify the post-consumer waste glass. However, although the invention is described herein as implemented using particular machinery, this in no way should limit the scope of the invention but as merely providing illustrations of some of the presently preferred embodiments of this invention. Thus the scope of the invention should be determined by the appended claims and their equivalents, rather than by the examples given.

What is claimed is:

1. Apparatus for the production of a glass powder from a stream of post-consumer waste glass containing non-frangible items, comprising:

equipment for pulverizing the stream in a manner such that glass in said stream is reduced to fragments of an average maximum size of ⅛ inch or less, while non-frangible items are not reduced to said size, equipment for performing a size-based separation of said reduced glass fragments from said non-frangible items;

equipment for washing said reduced glass fragments so as to remove plastic and paper fragments and organic contaminants therefrom;

equipment for drying the washed glass fragments to a moisture content of no more than about 2% by weight; and equipment for grinding the dried glass fragments into a powder, said equipment for grinding comprising a mill for reducing the particles in size and a size-based classifier in a continuous milling and size-based classification process, wherein the glass fragments having been ground into particles are withdrawn from said mill and conveyed to said size-based classifier, with a portion of said particles returned to said mill for further grinding, and the remainder of said particles being separated so as to form a powder, such that at least about 60% of the particles of said powder are of no more than 325 mesh particle size.

2. The apparatus of claim 1, wherein said equipment for pulverizing comprises a multi-flail pulverizer for reduction of glass in said waste stream to fragments.

3. The apparatus of claim 1, wherein said equipment for performing size-based separation of glass fragments from larger non-frangible items comprises a trommel.

4. The apparatus of claim 1, wherein said equipment for washing reduced glass fragments comprises multiple successive washing stations, each comprising a water bath into which said fragments are conveyed and an auger conveyor for removing said fragments from said bath.

5. The apparatus of claim 1, wherein said equipment for drying said washed fragments is a fluidized bed dryer, wherein said fragments are propelled upwardly by a stream of hot air.

6. The apparatus of claim 1, wherein said mill for grinding the dried glass fragments into a powder comprises a ball mill.

7. Apparatus for the production of a glass powder from a stream of post-consumer waste glass containing non-frangible items, comprising:
  equipment for pulverizing the stream in a manner such that glass in said stream is reduced to fragments of an average maximum dimension of not more than ⅛ inch, while non-frangible items are not reduced to said size,
  equipment for performing a size-based separation of said reduced glass fragments from said non-frangible items;
  equipment for washing said reduced glass fragments;
  equipment for drying the washed glass fragments; and
  equipment for grinding the dried glass fragments into a powder, said equipment for grinding comprising a mill for reducing the particles in size and a size-based classifier in a continuous milling and size-based classification process, wherein the glass fragments having been ground into particles are withdrawn from said mill and conveyed to said size-based classifier, with a portion of said particles returned from said size-based classifier to said mill for further grinding, and the remainder of said particles being separated so as to form a powder, such that at least about 60% of the particles of said powder are of no more than 325 mesh particle size.

8. The apparatus of claim 7, wherein said equipment for pulverizing comprises a multi-flail pulverizer for reduction of glass in said waste stream to fragments.

9. The apparatus of claim 7, wherein said equipment for performing size-based separation of glass fragments from larger non-frangible items comprises a trommel.

10. The apparatus of claim 7, wherein said equipment for washing reduced glass fragments comprises multiple successive washing stations, each comprising a water bath into which said fragments are conveyed and an auger conveyor for removing said fragments from said bath.

11. The apparatus of claim 7, wherein said equipment for drying said washed fragments is a fluidized bed dryer, wherein said fragments are propelled upwardly by a stream of hot air.

12. The apparatus of claim 7, wherein said mill for grinding the dried glass fragments into a powder comprises a ball mill.

13. Apparatus for the production of a glass powder from a stream of post-consumer waste glass containing non-frangible items, comprising:
  equipment for pulverizing the stream in a manner such that glass in said stream is reduced to fragments having an average maximum dimension, while non-frangible items are not reduced to said size,
  equipment for performing a size-based separation of said reduced glass fragments from said non-frangible items;
  equipment for washing said reduced glass fragments;
  equipment for drying the washed glass fragments; and
  equipment for grinding the dried glass fragments into a powder, said equipment for grinding comprising a mill for reducing the particles in size and a size-based classifier in a continuous milling and size-based classification process, wherein the glass fragments having been ground into particles are withdrawn from said mill and conveyed to said size-based classifier, with a portion of said particles returned from said size-based classifier to said mill for further grinding, and the remainder of said particles being separated so as to form a powder.

14. The apparatus of claim 13, wherein said equipment for pulverizing reduces said glass to said average maximum dimension of not more than ⅛ inch.

15. The apparatus of claim 13, wherein said equipment for pulverizing comprises a multi-flail pulverizer for reduction of glass in said waste stream to fragments.

16. The apparatus of claim 13, wherein said equipment for performing size-based separation of glass fragments from larger non-frangible items comprises a trommel.

17. The apparatus of claim 13, wherein said equipment for washing reduced glass fragments comprises multiple successive washing stations, each comprising a water bath into which said fragments are conveyed and an auger conveyor for removing said fragments from said bath.

18. The apparatus of claim 13, wherein said equipment for drying said washed fragments is a fluidized bed dryer, wherein said fragments are propelled upwardly by a stream of hot air.

19. The apparatus of claim 13, wherein said mill equipment for grinding the dried glass fragments into a powder comprises a ball mill.

20. The apparatus of claim 13, wherein said equipment for grinding is capable of producing a powder having particles at least 60% of which are no more than 325 mesh particle size.

\* \* \* \* \*